United States Patent [19]

Otoshi et al.

[11] 4,082,560

[45] Apr. 4, 1978

[54] VESSEL FOR USE IN HEATING FOOD

[75] Inventors: Yutaka Otoshi, Tokyo; Ken Ishino, Nagareyama, both of Japan

[73] Assignee: TDK Electronics Co., Ltd., Tokyo, Japan

[21] Appl. No.: 738,050

[22] Filed: Nov. 2, 1976

[51] Int. Cl.$^2$ .................. C04B 33/24; C04B 35/26; C04B 35/16

[52] U.S. Cl. .................. 106/45; 106/73.4; 252/62.56; 252/62.6; 252/62.62; 252/62.64

[58] Field of Search .................. 106/73.4, 45

[56] References Cited

U.S. PATENT DOCUMENTS

| | | | |
|---|---|---|---|
| 3,650,817 | 3/1972 | Motoyuki | 106/45 |
| 3,773,669 | 11/1973 | Yamauchi | 106/45 |
| 3,817,763 | 6/1974 | Smyser | 106/45 |

Primary Examiner—Winston A. Douglas
Assistant Examiner—Mark Bell
Attorney, Agent, or Firm—Burgess, Ryan and Wayne

[57] ABSTRACT

A vessel (ceramic cooking utensil) for use in heating food comprising a sintered body obtained by firing a mixture of ferrite powders and spodumene or petalite powders.

4 Claims, No Drawings

VESSEL FOR USE IN HEATING FOOD

BACKGROUND OF THE INVENTION

Iron or steel cooking utensils such as a frying pan or a griddle are used for heating food such as meat or fish. However, iron or steel it is difficult to control the temperature of iron or steel utensils, because iron or steel has high thermal conductivity (0.1 - 0.13 cal/cm.° C.sec) and low specific heat (about 0.1 cal/gr.° C), i.e. low heat capacity. Accordingly, it is difficult to heat slowly food such as meat or fish by using the iron or steel utensils.

As substitutes for iron or steel utensils (ironwares), ceramic utensils such as earthen wares have been proposed. Such earthen wares have low thermal conductivity (1.2 - 1.5 $\times$ $10^{-3}$ cal/cm.° C.sec) and high specific heat (about 0.25 cal/gr.° C), i.e. high heat content. However, such low thermal conductivity is a disadvantage of the earthen wares, and the earthen wares have another disadvantage that they are porous. The porosity thereof is 15 - 20%. Accordingly, on heating meat or fish on such ceramic plate, gravy sinks into the pores of the plate, i.e. the cooking utensil absorb the gravy to become smudged or discolored.

An object of the present invention is provide improved ceramic cooking utensils for use in heating meat, fish or other foods.

SUMMARY OF THE INVENTION

As herein described there is provided a vessel for use in heating food consisting essentially of a sintered body of 4 to 40% by weight of a ferrite component of the formula $MFe_2O_4$ in which M is a bivalent metal selected from the group consisting of Mn, Mg, Zn, Fe, Ni and Cu, and 96 to 60% by weight of a mineral component of the formula $Li_2O.Al_2O_2.nSiO_2$ in which $n$ is 4 or 8.

Also herein described is a method of manufacturing a vessel for use in heating food comprising firing at a temperature of from 1050° to 1300° C for about one to three hours a molding of a mixture of 4 to 40% by weight of ferrite powders of the formula $MFe_2O_4$, in which M is a bivalent metal selected from the group consisting of Mn, Mg, Zn, Fe, Ni and Cu, and 96 to 60% by weight of mineral powders of the formula $Li_2O.Al_2O_3.nSiO_2$ in which $n$ is 4 or 8.

DESCRIPTION OF THE PREFERRED EMBODIMENTS

The present invention relates to a vessel (ceramic cooking utensil) for use in heating food. This vessel consists essentially of a sintered body of ferrites and natural minerals, i.e. spodumene or petalite. Such a sintered body has characteristics in that (1) the heat conductivity is moderate for heating food, (2) the specific heat is high, (3) the resistance against thermal spalling is high, and (4) the porosity is low.

The sintered body is made by firing a mixture of 4 to 40% by weight of ferrite powders and 96 to 60% by weight of mineral powders. The ferrite is a compound having a general formula of $MFe_2O_4$ (M is a bivalent metal such as Mn, Mg, Zn, Fe, Ni or Cu) and the mineral is a compound having a general formula of $Li_2O.Al_2O_3.nSiO_2$ (wherein $n$ is 4 or 8). The minerals having the formula of $Li_2O.Al_2O_3.4SiO_2$ and $Li_2O.Al_2O_3.8SiO_2$ are referred to as spodumene and petalite, respectively. Both spodumene and petalite can be obtained as natural products. In this specification, the term "mineral" represents spodumene or petalite.

Methods of manufacturing the vessel of the present invention are as follows:
1. Ferrite powders and mineral powders (powders of spodumene or petalite) are mixed in a fixed ratio in a ball mill.
2. The mixture is molded into a desired shape.
3. The molding (green briquette) is fired at a fixed temperature between 1050° C and 1300° C for about one to three hours to obtain a sintered body.

Two ways of manufacturing said sintered body are available; that is:
1. A mixture of MO (M is a bivalent metal) and $Fe_2O_3$ is molded and then fired to produce a sintered body of ferrite, and this sintered body is pulverized into ferrite powders. The ferrite powders are mixed with the mineral (spodumene or petalite) powders in a fixed ratio, and the mixture thus obtained is molded and then fired.
2. A mixture of MO and $Fe_2O_3$ in such a ratio that the ferrite will be produced when fired, is mixed in a fixed ratio with mineral powders, and the mixture thus obtained is molded and then fired.

Instead of the natural spodumene or petalite, synthetic spodumene or petalite may be used, which has been obtained by firing a mixture of $Li_2O$, $Al_2O_3$ and $SiO_2$ in such a ratio that spodumene or petalite will be produced when fired.

In the sintered body of the present invention, clay such as Gairome-clay (a type of clay found in Japan) can be added in an amount of up to 10% by weight.

As a bivalent metal of the ferrite, Mn, Mg, Zn, Fe, Ni and Cu may suitably be used. Among them, Mn, Mg, Zn and Fe are of practical use because of their low price. In the following examples, therefore, a Mn-Zn ferrite is used as a ferrite component.

The vessel of the present invention has properties as shown below:

| | |
|---|---|
| Thermal conductivity | 1.5 — $6 \times 10^{-8}$ cal/cm° C sec |
| Specific heat | about 0.25 cal/gr. ° C |
| Temperature difference of Spalling* | 300 – 450° C |
| Porosity | < 10% |

*"Temperature difference of spalling" means that the sintered body is resistant to the thermal spalling up to this temperature difference.

The vessel of the present invention can be made at a low cost due to the fact that natural minerals such as spodumene or petalite may be used as a mineral component.

The following examples are given by way of illustration of the methods of carrying out the present invention and are not intended as a limitation of this invention.

EXAMPLE 1

A mixture of 0.8 mol of $MnCO_3$, 1.2 mols of ZnO and 2 mols of $Fe_2O_3$ was molded and then fired at a temperature of about 1250° C for one hour. The Mn-Zn ferrite sintered body thus obtained was pulverized to form a Mn-Zn ferrite powder having particle size of about $3\mu$.

On the other hand, natural spodumene was pulverized to make a spodumene powder having a particle size of about $10\mu$.

The ferrite powders and the spodumene powders were mixed in a ratio in Table - 1 below, and the mixture was molded into the plate shape of 30cm × 30cm × 7mm, and then fired at a temperature of about 1100° C for about 3 hours. A deep brownish ferrite-spodumene sintered body was obtained.

Table - 1

| Sample No. | Mn-Zn ferrite powder | Spodumene powder |
|---|---|---|
| 1 | 4 | 96 |
| 2 | 10 | 90 |
| 3 | 20 | 80 |
| 4 | 30 | 70 |
| 5 | 40 | 60 |

EXAMPLE 2

The same procedure as shown in Example 1 was repeated except that petalite is used instead of spodumene as a mineral component.

The ferrite powders and the petalite powders were mixed in a ratio in Table - 2 below:

Table - 2

| Sample No. | Mn-Zn ferrite powder | Petalite powder |
|---|---|---|
| 6 | 4 | 96 |
| 7 | 20 | 80 |
| 8 | 30 | 70 |
| 9 | 40 | 60 |

Properties of the sintered body:

Properties of the ferrite-spodumene and the ferrite-petalite sintered bodies are collectively shown in Table - 3 below:

Table - 3

| Sample No. | Thermal conductivity (cal/cm ° C sec) | Temperature difference of spalling (° C) | Water* absorption % |
|---|---|---|---|
| 1 | $1.7 \times 10^{-}$ | >400 | about 8 |
| 2 | 2.0 | >400 | 7 |
| 3 | 3.2 | 350 | 5 |
| 4 | 4.5 | 350 | 4 |
| 5 | 5.8 | 300 | 4 |
| 6 | 1.6 | >400 | 9 |
| 7 | 3.5 | >400 | 6 |
| 8 | 4.8 | 350 | 5 |
| 9 | 6.0 | 350 | 4 |

*"Water absorption" is shown as a measure of the porosity of the sintered body.

A sintered body containing a ferrite component in an amount of less than 4% by weight has high porosity and therefore has low thermal conductivity. On the other hand, a sintered body containing a ferrite component in an amount of more than 40% by weight has low resistance against thermal spalling. Accordingly, such sintered bodies containing the ferrite component in an amount of less than 4% or more than 40% by weight are undesirable as a cooking utensil for heating food.

We claim:

1. A vessel for use in heating food consisting essentially of a sintered body of 4 to 40% by weight of a ferrite component of the formula $MFe_2O_4$ in which M is a bivalent metal selected from the group consisting of Mn, Mg, Zn, Fe, Ni and Cu, and 96 to 60% by weight of a mineral component of the formula $Li_2O.Al_2O_3.nSiO_2$ in which $n$ is 4 or 8.

2. A vessel for use in heating food according to claim 1 wherein said sintered body of a ferrite component and a mineral component contains clay in an amount of up to 10% by weight.

3. A method of manufacturing a vessel for use in heating food comprising firing at a temperature of from 1050° C to 1300° C for about one to three hours a molding of a mixture of 4 to 40% by weight of ferrite powders of the formula $MFe_2O_3$ in which M is a bivalent metal selected from the group consisting of Mn, Mg, Zn, Fe, Ni and Cu, and 96 to 60% by weight of mineral powders of the formula $Li_2O.Al_2O_3.nSiO_2$ in which $n$ is 4 or 8.

4. A method of manufacturing a vessel for use in heating food according to claim 1 wherein said mixture of ferrite powders and mineral powders contains clay in an amount of up to 10% by weight.

* * * * *

UNITED STATES PATENT OFFICE
CERTIFICATE OF CORRECTION

Patent No. 4,082,560      Dated April 4, 1978

Inventor(s) Yutaka Otoshi, et al

It is certified that error appears in the above-identified patent and that said Letters Patent are hereby corrected as shown below:

Column 1, line 7: "iron or steel" should be cancelled.

Signed and Sealed this

Twenty-first Day of November 1978

[SEAL]

Attest:

RUTH C. MASON
Attesting Officer

DONALD W. BANNER
Commissioner of Patents and Trademarks